(12) United States Patent
Bisgaard (10) Patent No.: US 7,963,160 B2
(45) Date of Patent: Jun. 21, 2011

(54) TEST BENCH COMPRISING ANGLE ADJUSTMENT MEANS AND METHODS FOR TESTING WIND TURBINE EQUIPMENT

(75) Inventor: Jan Bisgaard, Viborg (DK)

(73) Assignee: Vestas Wind Systems A/S (DK)

( * ) Notice: Subject to any disclaimer, the term of this patent is extended or adjusted under 35 U.S.C. 154(b) by 73 days.

(21) Appl. No.: 12/348,200

(22) Filed: Jan. 2, 2009

(65) Prior Publication Data

US 2009/0173148 A1 Jul. 9, 2009

Related U.S. Application Data

(63) Continuation of application No. PCT/DK2007/000332, filed on Jul. 3, 2007.

(30) Foreign Application Priority Data

Jul. 3, 2006 (DK) ................................. 2006 00912

(51) Int. Cl.
*G01W 1/00* (2006.01)
(52) U.S. Cl. ...................................... 73/170.01; 73/856
(58) Field of Classification Search .................. None
See application file for complete search history.

(56) References Cited

U.S. PATENT DOCUMENTS

| | | | | |
|---|---|---|---|---|
| 5,753,799 A | * | 5/1998 | Shah | 73/40 |
| 6,862,940 B2 | * | 3/2005 | Romano | 73/856 |
| 2005/0172729 A1 | * | 8/2005 | Gonzalez et al. | 73/856 |
| 2009/0107255 A1 | * | 4/2009 | Jensen | 73/862 |
| 2009/0107256 A1 | * | 4/2009 | Jensen | 73/862 |

FOREIGN PATENT DOCUMENTS

| | | |
|---|---|---|
| EP | 0845666 A1 | 6/1998 |
| EP | 1564405 A1 | 8/2005 |
| JP | 3238376 A | 10/1991 |
| WO | 2004005879 A1 | 1/2004 |

OTHER PUBLICATIONS

Scott Larwood, et al, Controlled Velocity Testing of an 8-kW Wind Turbine, National Renewable Energy Laboratory, Jul. 2001 NREL/CP-500-30299, American Wind Energy Association WindPower 2001 Conference, Washington, D.C. Jun. 4-7, 2001, (19 pages).

Harri Vihriala, Control of Variable Speed Wind Turbines, Tampere University of Technology, Doctoral dissertation, Oct. 29, 2002, (112 pages).

(Continued)

*Primary Examiner* — Andre J Allen
(74) *Attorney, Agent, or Firm* — St. Onge Steward Johnston & Reens LLC (57) ABSTRACT

The invention relates to a test bench for testing wind turbine equipment. The test bench comprises one or more load applying means directly or indirectly applying load to the equipment during said test and wherein the test bench comprises angle adjustment means for adjusting a test angle (A) of the equipment in relation to a horizontal plane. The invention further relates to methods for testing wind turbine equipment.

19 Claims, 6 Drawing Sheets

OTHER PUBLICATIONS

Didat, J.R., et al, "Sec. BL3.287: Modelling and experimental testing of a grid-connected small Wind Energy Conversion System" EWEC 2006 (European Wind Energy Conference Proceeding, Feb. 28, 2006, XP-002454940, (2 pages).

Camblong, et al: "Experimental evaluation of wind turbines maximum power point tracking controllers" Energy Conversion and Management, Elsevier Science Publishers, Oxford, GB, vol. 47, No. 18-19, May 11, 2006, pp. 2846-2858, XP-005589814, (7 pages).

International Search Report and the Written Opinion of the International Searaching Authority, Nov. 20, 2007 (14 pages).

National Renewable Energy Laboratory; "Wind Turbine Testing in the NREL Dynamometer Test Bed"; Presented at AWEA's Wind Power 2000 Conference in California, Apr. 30-May 4, 2000; 12 pages.

* cited by examiner

US 7,963,160 B2
TEST BENCH COMPRISING ANGLE ADJUSTMENT MEANS AND METHODS FOR TESTING WIND TURBINE EQUIPMENT

CROSS-REFERENCE TO RELATED APPLICATIONS

The present application is a continuation of pending International patent application PCT/DK2007/000332 filed on Jul. 3, 2007 which designates the United States and claims priority from Danish patent application PA 2006 00912 filed on Jul. 3, 2006, the content of which is incorporated herein by reference.

FIELD OF THE INVENTION

The invention relates to a test bench for testing wind turbine equipment and methods for testing wind turbine equipment.

BACKGROUND OF THE INVENTION

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

Large modern wind turbines get bigger and bigger all the time and the different components of the wind turbine such as the gearbox, generator, braking system etc. do also get bigger. Furthermore, the technological development produces components and interaction between components which are more and more specialized and complex. This is of course advantageous regarding efficiency and output of the wind turbine but since these large wind turbines are expensive and breakdowns can be very costly, it is important to ensure that the life, durability, quality, capacity etc. of the wind turbine components are well documented.

One way of doing this would be to gather information on exciting wind turbines and then base the maintenance program, the choice of components and so on, on a statistical analysis of these data. But this method is rather inefficient in that if the data reveals that a component with an expected life of 20 years only lasts an average of 7 years, the similar wind turbines produced in these 7 years will also contain the defective component, and the data can most often not disclose whether the component breaks down because of poor quality, if it has been mounted or used wrong or if several interacting factors causes the reduced life.

Another way of solving this problem is disclosed in European patent application No EP 1 564 405 A1. This application discloses a test bench for carrying out fatigue and load tests on the structural members of primarily the nacelle and the nacelle components. But testing the strength of the structural members of the nacelle has the main purpose of reducing the use of material or optimizing the design of these structural members, hereby reducing the cost and weight of the members and ensuring that they can withstand the loads, that they are affected by during normal operation of the wind turbine. It will not provide helpful information regarding selection of components, the interaction of components and other which could prevent breakdowns and reduce the cost of the components.

It is therefore an object of the invention to provide for an advantageous and efficient technique for testing wind turbine equipment.

Especially, it is an object of the invention to provide for a technique for testing wind turbine equipment which offers more realistic load types.

SUMMARY OF THE INVENTION

The invention provides for a test bench for testing wind turbine equipment. The test bench comprises one or more load applying means directly or indirectly applying load to the equipment during said test and wherein the test bench comprises angle adjustment means for adjusting a test angle of the equipment in relation to a horizontal plane.

The rotor on a large modern wind turbine is for different reasons angled so that the rotor plane is not perpendicular to the ground. This causes that the drive train in most wind turbines are positioned in an angle not parallel with the horizontal plane of the ground because the drive train is perpendicular to the rotor plane. Since the drive train and the drive train components are very essential component of a wind turbine it would be advantageous to test these components on a test bench and in particular on a test bench which could test the equipment in a test angle different from 0° in relation to a horizontal plane.

In an aspect of the invention, said test angle being stationery or dynamically adjustable during said test.

Hereby is achieved an advantageous embodiment of the invention.

In an aspect of the invention, said angle adjustment means comprise means for adjusting said test angle to substantially correspond to a normal operation angle of said equipment e.g. the angle of a drive train in a nacelle in relation to a tower.

This is advantageous, in that it hereby is possible to provide for a test bench capable of performing a more efficient and/or realistic test.

In an aspect of the invention, drive means of said test bench rotates an input shaft of said equipment during the test.

By rotating the input shaft of the equipment during the test and at the same time applying load to the equipment, it is possible to simulate the loads acting on the equipment during normal operation of a wind turbine as well as extreme situations, hereby making it possible to compare different equipment under the same normal load conditions as well as performing accelerated life tests. This is advantageous, in that it hereby is possible to perform a more efficient test of the equipment, which enables that the load types and sizes dynamically adjusted e.g. to be substantially realistic if needed or to inflict overload if needed.

It should be emphasised that by the term "shaft", is to be understood any kind of bar, rod, pipe, tube, ring, coupling, sleeve, muff or other capable of transferring a rotation. The shaft is in no way limited to being solid but could also e.g. be a hollow ring or sleeve forming or attached to the planet carrier or annulus gear of the wind turbine gearbox.

In an aspect of the invention, said drive means is an electrical motor.

The rotation speed and particularly the torque of an electrical motor are easily controlled very accurately, which is advantageous in that it hereby is possible to carry out a more efficient, accurate and/or realistic test of the wind turbine equipment.

In an aspect of the invention, said equipment are wind turbine drive train components such as main bearing, gearbox and generator, and wherein said generator being connected to a utility grid or utility grid simulating means.

The drive train components of the wind turbine does all comprise rotating parts placed in the nacelle in a normal operation angle, which is different from 0° in relation to a horizontal plane. The fact that the drive train components are most often placed in the nacelle makes it very difficult and expensive to repair and replace them. It is therefore advantageous, that particularly the drive train components are tested on a test bench comprising angle adjustment means for adjusting a test angle of the equipment and load applying means for applying load to the components.

In an aspect of the invention, said utility grid or utility grid simulating means being an indirect load applying mean of said test bench.

This is advantageous, in that by indirectly applying load to the equipment by connecting the generator to a utility grid or utility grid simulating means, it is possible to more accurately simulate the load situations of a real wind turbine or to perform accelerated life tests e.g. by establishing a permanent overload situation or varying load situations.

In an aspect of the invention, said utility grid simulating means comprise means for dynamically adjusting the grid voltage and the grid frequency.

By enabling dynamically adjustment of the grid voltage and the grid frequency during the test it is both possible to simulate normal operation conditions of the equipment as well as extreme or fault situations of the grid hereby facilitating a more efficient and/or realistic test.

In an aspect of the invention, said utility grid simulating means comprise a converter.

Making the utility grid simulating means comprise a converter is advantageous, in that a converter provides means for dynamically adjusting the different grid parameters hereby enabling a more efficient test.

In an aspect of the invention, at least one of said one or more load applying means comprise means for applying axial and/or radial load to an input shaft of said equipment.

The input shaft of any wind turbine equipment will always—at least to some degree—be influenced by axially and/or radial directed forces during normal operation of the equipment in a real wind turbine. It is therefore advantageous to apply these loads during the test to produce a more efficient and/or realistic test.

In an aspect of the invention, said equipment is a wind turbine generator.

The function of the generator of a wind turbine is essential to the efficiency of the wind turbine and since the generator is very complex and expensive and since it most often are situated angled in the nacelle of the wind turbine, where it is difficult to repair and replace, it is advantageous to provide a test bench which is capable of a adjusting a test angle of the generator and at the same time capable of applying load to the generator during a test.

In an aspect of the invention, said test bench is stationary.

A wind turbine test bench for testing equipment such as wind turbine generators could easily weigh up to 50 metric ton, and it is therefore advantageous to make the test bench stationary.

In an aspect of the invention, said test bench comprise climate controlling means for substantially controlling one or more climate parameters such as the temperature, humidity and air pressure of the surroundings of at least a part of said equipment.

The climate parameters are very important stress factors of an operating wind turbine and particularly very high or low temperatures or constant variations in the temperature can potentially be very damaging to the wind turbine equipment. By providing the test bench with climate controlling means it is possible to substantially control one or more of the climate parameters hereby enabling a more efficient and/or realistic test of the equipment. Among other things this would enable HALT (Highly Accelerated Life Testing) of the equipment, which is a well known and very efficient way of testing and/or estimating the life and/or the load limits of the equipment in a relative short period of time compared to the desired life of the equipment.

In an aspect of the invention, said climate controlling means is at least one climate box enclosing said equipment or at least a part of said equipment.

Substantially enclosing the equipment or at least a part of the equipment by a climate-box provides for a relatively simple and inexpensive way of establishing a controlled environment around the equipment. Furthermore a climate-box substantially enclosing the equipment would also have the side effect of being sound absorbing, hereby reducing the noise emitted form the test bench.

In an aspect of the invention, said test bench comprise a monitoring system monitoring said equipment and/or said test bench during said test.

The equipment is tested for among other reasons to extract important information of the equipment such as the equipments life, durability, efficiency and general capacity and quality. It is therefore advantageous to provide the test bench with a monitoring system for gathering these or other information to be used for analysing the tested equipment.

In an aspect of the invention, said angle adjustment means comprise one or more linear actuators for positioning said test bench or a part of said test bench comprising said equipment in said test angle.

Using linear actuators for positioning the equipment in a test angle is advantageous, in that linear actuators are a simple and inexpensive way of angling the part of the test bench on which the equipment is placed.

In an aspect of the invention, said one or more linear actuators are hydraulic cylinders.

A hydraulic cylinder is capable of lifting a relatively great load compared to its size, which is advantageous, in that it enables a more advantageous design of a test bench.

In an aspect of the invention, said load applying means comprise means for inflicting an axial load to an input shaft of said equipment.

Besides torque the generator would normally only experience axial forces in the input shaft (if the drive train components are aligned properly during mounting) during normal operation of the wind turbine and it is therefore advantageous to enable that the test bench can inflict an axial load on the input shaft of the tested equipment.

In an aspect of the invention, said means for inflicting an axial load comprises means for dynamically adjusting said axial load.

The size of an axial load on equipment in a operating wind turbine could vary with the wind speed, power production or other at to enable a realistic or accelerated test it could be advantageous to enable that the axial load could be varied and/or adjusted over time.

The invention further provides for a method for testing wind turbine equipment. The method comprises the steps of
positioning the equipment in a test bench,
establishing the equipment in a test angle by means of angle adjustment means of the test bench, and
directly and/or indirectly applying load to the equipment by means of load applying means of the test bench.

By positioning the equipment in a test angle while stressing the equipment by at the same time applying load to the equipment is advantageous, in that it hereby is possible to perform a more efficient and/or realistic test.

It should be emphasised that the term "positioning said equipment in a test bench" is not to be understood only as the test bench surrounding the equipment during the test. "In" is only one preposition among many which could be used in this connection such as "at" or "on".

Also, the invention provides for a further method for testing wind turbine equipment. The method comprises the steps of
establishing a test bench in a test angle by means of angle adjustment means of the test bench,
positioning the equipment in the test bench, and
directly and/or indirectly applying load to the equipment by means of load applying means of the test bench.

If e.g. many generators where to be tested successively at the same test angle it could be advantageous to establish the test bench in the desired test angle and then subsequently test the equipment without changing the test angle between replacements of test equipment e.g. to save time.

In an aspect of the invention, said test angle being stationery or dynamically adjustable during said test.

In an aspect of the invention, said test angle is established to substantially correspond to a normal operation angle of said equipment e.g. the angle of a drive train in a nacelle in relation to a tower.

In an aspect of the invention, an input shaft of said equipment is rotated by drive means of said test bench during the test.

In an aspect of the invention, load is applied to said equipment by connecting a generator of said equipment to a utility grid or utility grid simulating means.

In an aspect of the invention, said utility grid simulating means comprise means for dynamically adjusting the grid voltage and the grid frequency.

In an aspect of the invention, axial and/or radial load is applied to an input shaft of said equipment during the test.

In an aspect of the invention, one or more climate parameters such as the temperature, humidity and air pressure of the surroundings of at least a part of said equipment is controlled during the test.

In an aspect of the invention, said equipment and/or said test bench is monitored by a monitoring system during the test.

BRIEF DESCRIPTION OF THE DRAWINGS

The invention will be described in the following with reference to the figures in which.

DETAILED DESCRIPTION OF THE INVENTION

Figure 1:
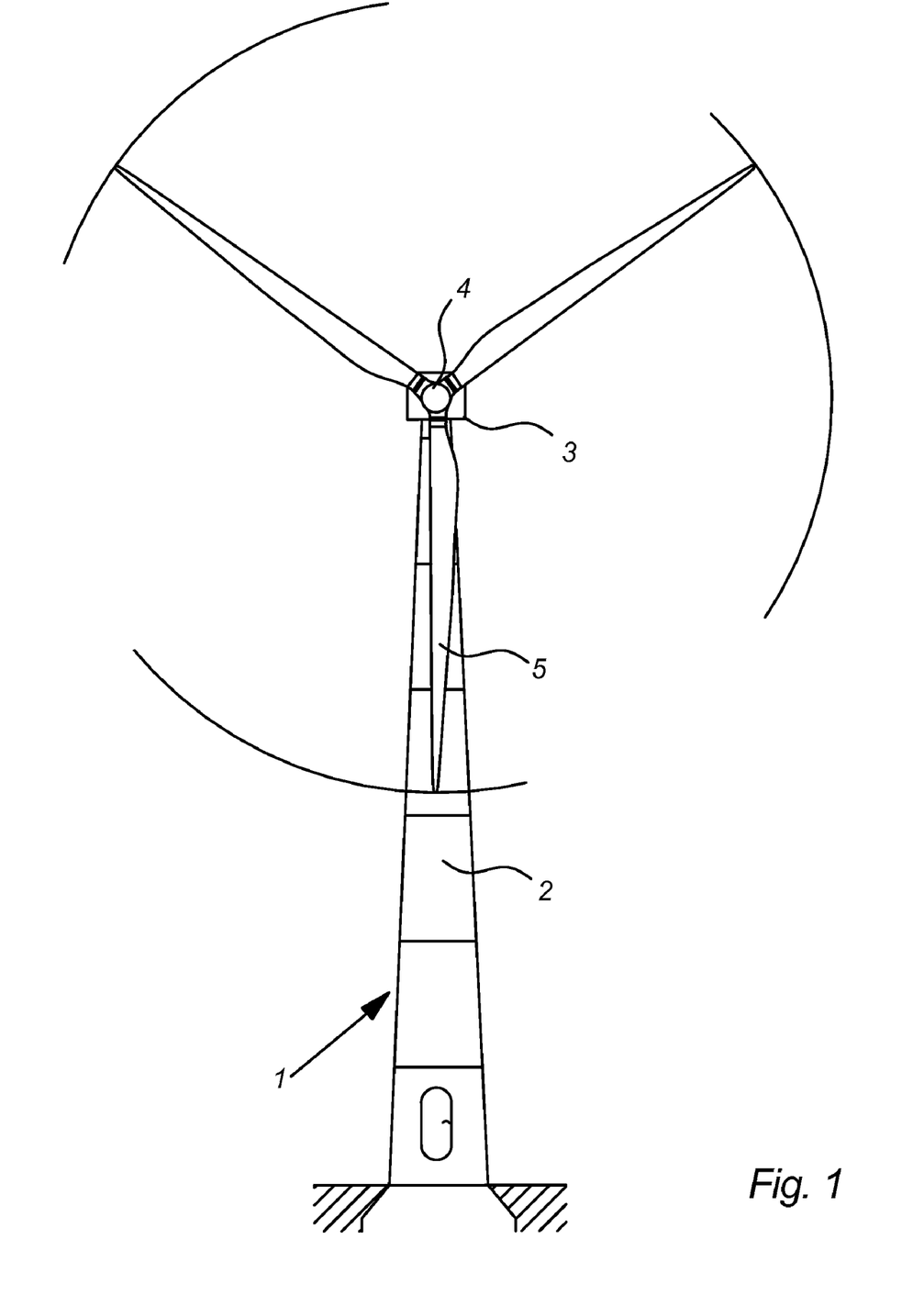
FIG. 1 illustrates a large modern wind turbine known in the art, as seen from the front.

FIG. 1 illustrates a modern wind turbine 1, comprising a tower 2 placed on a foundation and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
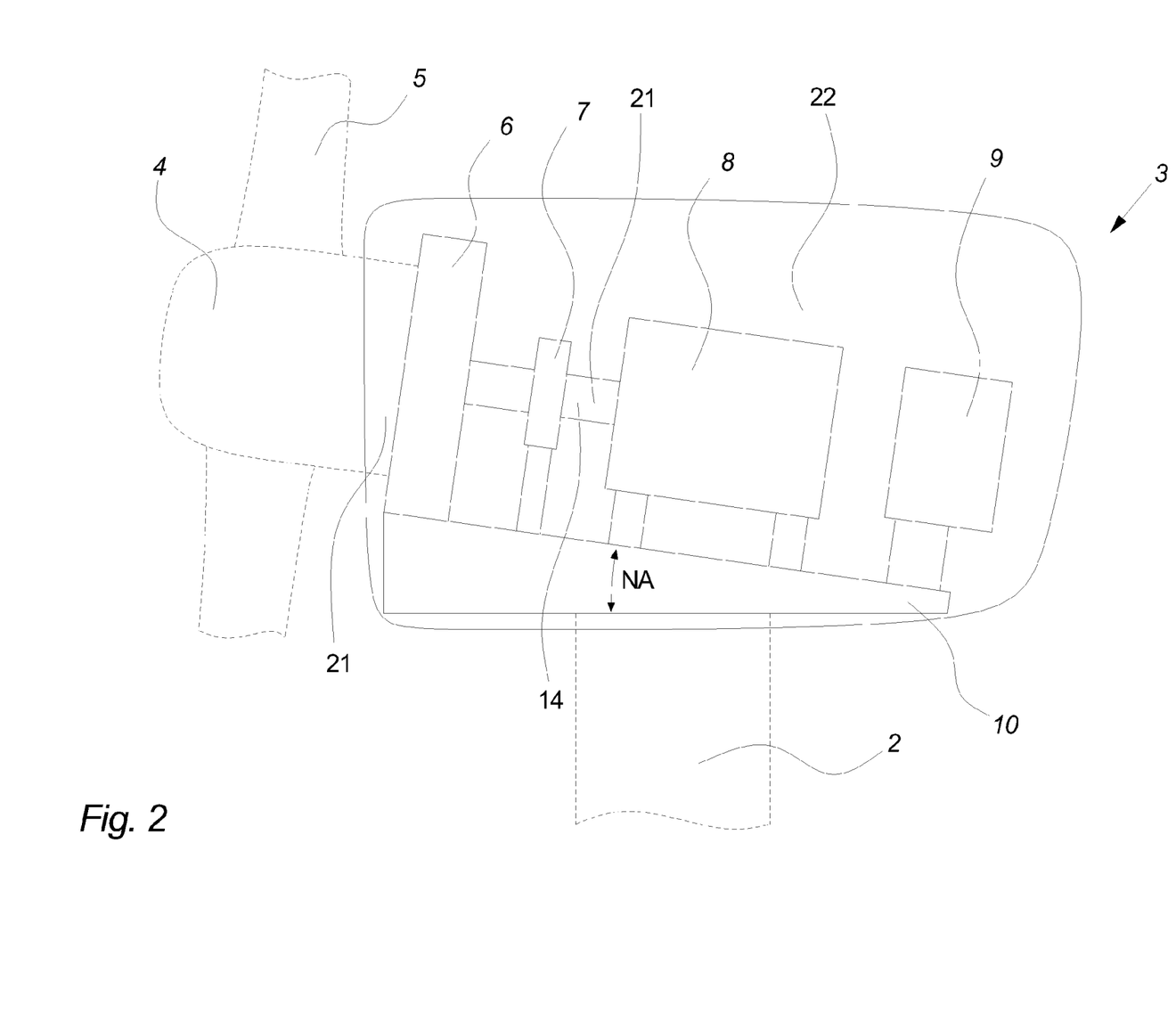
FIG. 2 illustrates a cross section of an embodiment of simplified nacelle known in the art, as seen from the side.

FIG. 2 illustrates a simplified cross section of a nacelle 3, as seen from the side.

Nacelles 3 exists in a multitude of variations and configurations but in most cases the drive train 14 in the nacelle 3 almost always comprise one or more of the following components: a gearbox 6, a coupling (not shown), some sort of breaking system 7 and a generator 8. A nacelle 3 of a modern wind turbine 1 can also include a converter 9, an inverter (not shown) and additional peripheral equipment such as further power handling equipment, control cupboards, hydraulic systems, cooling systems and more.

The weight of the entire nacelle 3 including the nacelle components 6, 7, 8, 9 is carried by a load carrying structure 10. The components 6, 7, 8, 9 are usually placed on and/or connected to this common load carrying structure 10. In this simplified embodiment the load carrying structure 10 only extends along the bottom of the nacelle 3 e.g. in form of a bed frame to which some or all the components 6, 7, 8, 9 are connected. In another embodiment the load carrying structure 10 could comprise a gear bell transferring the load of the rotor 4 to the tower 2, or the load carrying structure 10 could comprise several interconnected parts such as latticework.

In this embodiment of the invention the drive train 14 is established in a normal operation angle NA of 8° in relation to a plane perpendicular to the tower 2, a centre axis through the tower 2 and a horizontal plane. The drive train 14 is for among other reasons angled to enable that the rotor 4 can be angled correspondingly e.g. to ensure that the blades 5 do not hit the tower 2, to compensate for the differences in wind speed at the top and bottom of the rotor 4 and other.

Figure 3:
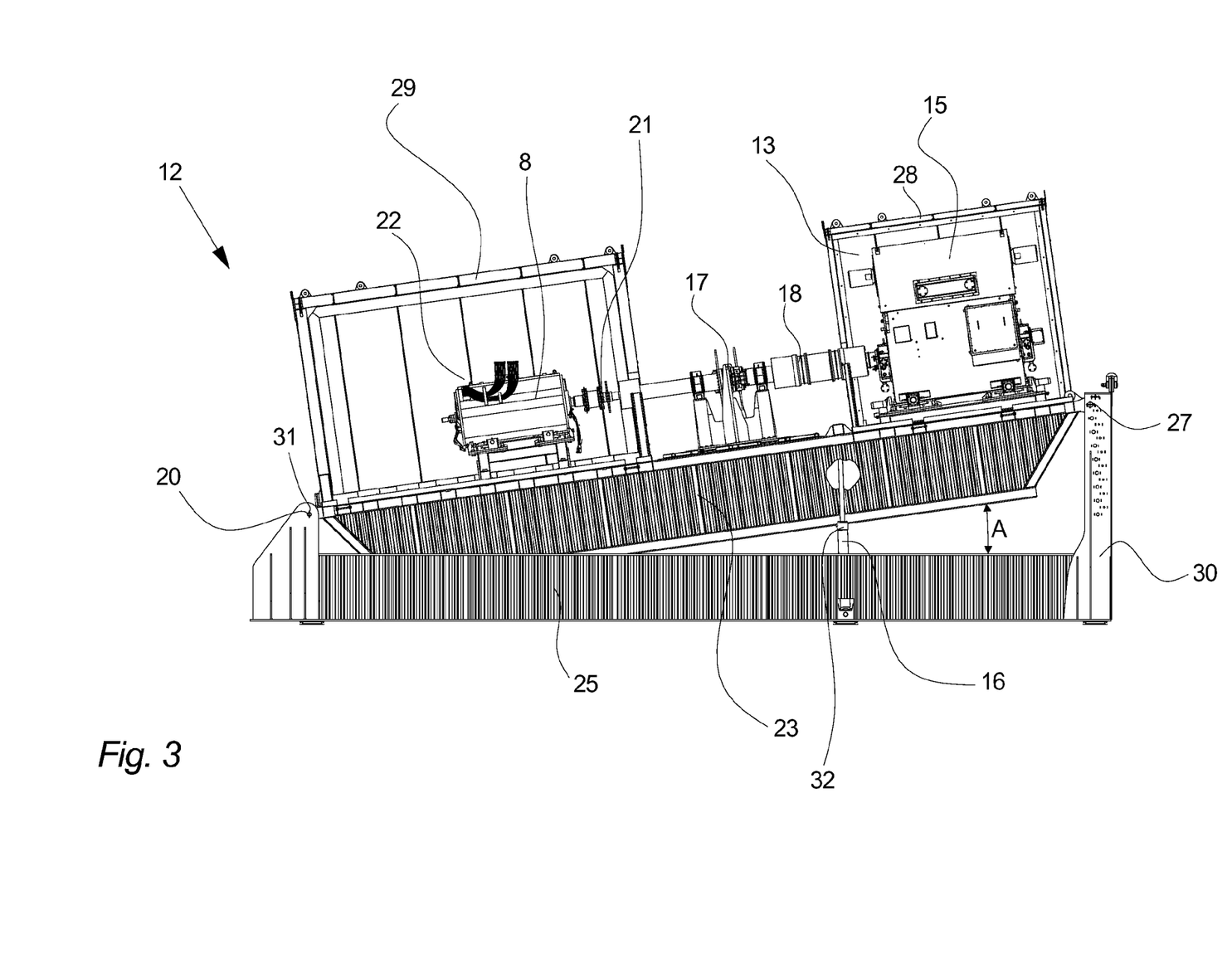
FIG. 3 illustrates an embodiment of a test bench testing a wind turbine generator, as seen from the side.

FIG. 3 illustrates an embodiment of a test bench 12 testing a wind turbine generator 8, as seen from the side.

In this embodiment the test bench 12 is configured to test a wind turbine generator 8. Since a generator 6 is made to produce power optimally at substantially the same rotation speed as the nominal rotation speed of most electrical motors 15 the drive means 13 of this test bench 12 does not comprise a gearbox, making the output shaft of the test bench motor 15 being more or less directly coupled to the input shaft 21 of the generator 8 through a coupling 18, a shaft adapter 24 and a braking system 17 of the test bench 12. In another embodiment the drive means 13 could further comprise a gearbox.

Since the generator 8 is tested without the load carrying structure 10 which could define its orientation in a nacelle 3, the test bench 12 is in this embodiment provided with angle adjustment means 16 in form of two linear actuators 32 and two rotational joints 20, enabling that the generator 8 can be tested in an test angle A.

The test angle A would during the test correspond to the normal operation angle NA in relation to a horizontal plane when the generator 8 is mounted in an operating wind turbine 1.

In this embodiment the generator 8 is connected to grid simulating means applying an indirect load to the input shaft 21 of the generator 8, in that when connected to these grid simulating means it is possible to simulate different situations where the generator produce power making the rotor part of the generator 8 resist rotation and thereby apply load to the input shaft 21.

In this embodiment of the invention the test bench 12 comprise noise reducing means 28 in the form of a sound absorbing box 28 substantially enclosing a part of the drive means 13 of the test bench 12—namely the electrical motor 15 providing a rotation of the generator input shaft 21—hereby enabling that the noise produced by particularly the electrical motor 15 are absorbed by the box 28, hereby reducing the noise emission from the test bench 12.

In this embodiment of the invention the test bench 12 further comprises climate controlling means 29 in form of a climate box 29 substantially enclosing the wind turbine generator 8 being tested on the bench 12.

Figure 4:
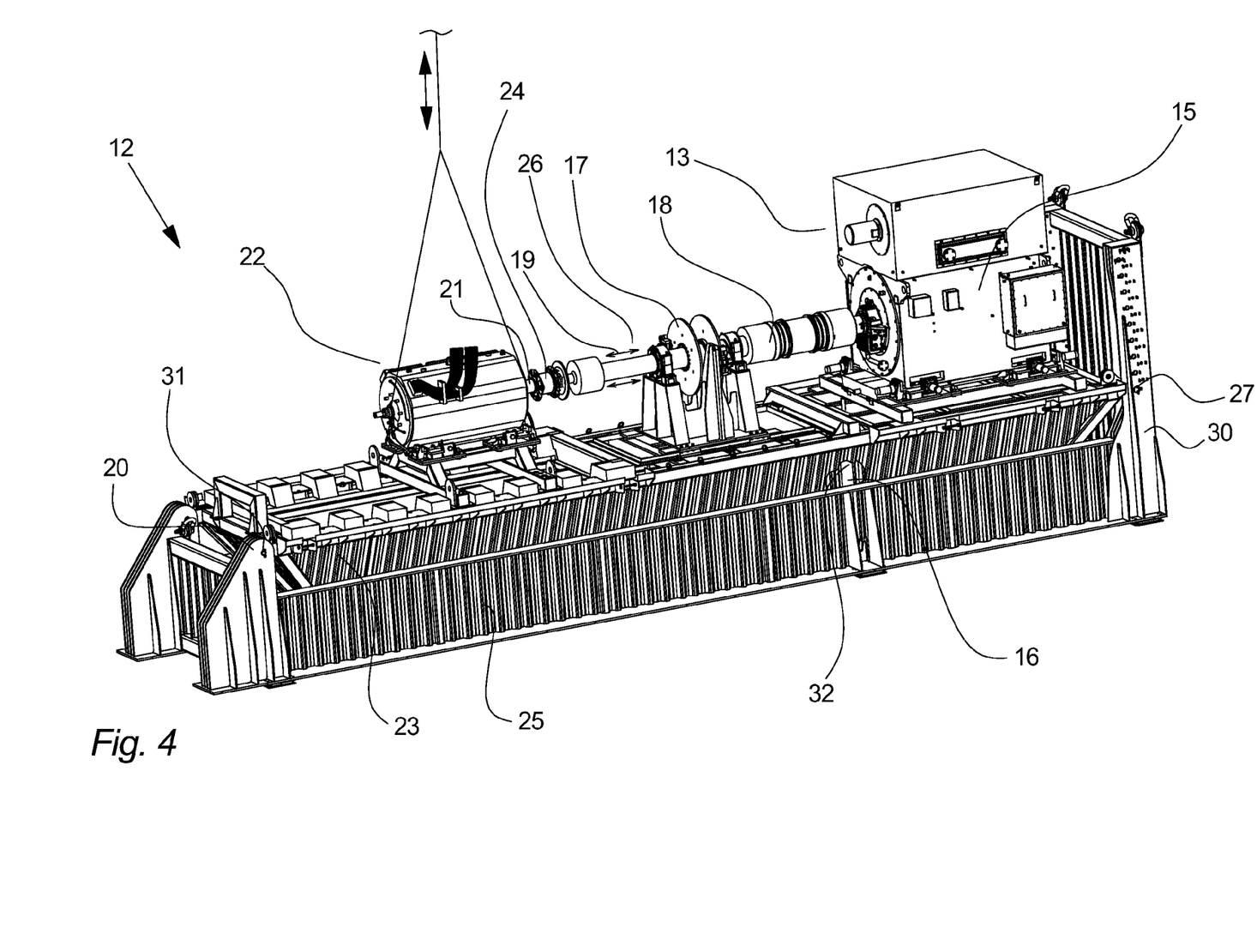
FIG. 4 illustrates a test bench during the mounting of wind turbine generator, as seen in perspective.

FIG. 4 illustrates a test bench 12 during the mounting of wind turbine generator 8, as seen in perspective.

In this embodiment the test bench 12 is in a substantially horizontal position when the wind turbine generator 8 is lifted onto and rigidly connected to the bench 12. Before the test starts, the angle adjustment means 16 of the test bench 12 would tilt the equipment 22 into a test angle A and when the test is over the bench 12 is lowered to a substantially horizontal position again, while the tested equipment is removed. A number of manually moveable support pins 27 are can be applied at the gable 30 of the test bench 12 which would thoroughly fixate the test bench 12 in a desired position.

In another embodiment of the invention the test bench 12 would be established in a desired test angle A before the equipment 22 was placed on the test bench 12. Even though this could complicate the mounting and dismounting procedure of the equipment 22 is could be advantageous if e.g. a high number of succeeding generators 8 where to be tested at the same test angle A. Not having to tilt the test bench 12 back and forth between horizontal and the test angle A for every new generator 8 could save time.

In this embodiment the tested equipment 22 is rigidly connected to a top part 23 of the test bench 12 and the angle adjustment means 16 tilts the entire top part 23 of the test bench 12—including the equipment 22 and drive means 13—in relation to a stationary bottom part 15, which is rigidly connected to the ground. In another embodiment, the angle adjustment means 16 could further comprise means for separate tilting of the part of the top part 23 to which the tested equipment 22 where attached, making the drive means 13 or most of the drive means 13 maintain a stationary position in a fixed angle in relation to the top part 23 at all times.

In a further embodiment the top part would substantially only comprise the part on which the tested equipment is attached, making the rest of the test bench 12 including the drive means 13 or most of the drive means 13 maintain a stationary position in a fixed angle in relation to a horizontal plan at all times. This setup would demand that the rotation from the drive means 13 could be transferred to the input shaft 21 of the equipment substantially no-matter the angle differences, which e.g. could be enabled by offsetting the drive means 13 to one side and then connecting the drive means 13 to the input shaft 21 of the equipment 22 by means of a belt drive, a chain drive or the like (not shown), hereby enabling substantially free vertical movement of the equipment, while the drive means remained in a fixed position.

The transferring of rotation from the drive means 13 to the equipment 22, which allows relative movement between the equipment 22 and the drive means 13, could also be enabled by a number of cardan or universal joints (not shown).

Both of the above mentioned setups would among other things enable that the load applying means 19 could comprise vibration inducing means (not shown), which could induce vibrations in the tested equipment substantially without vibrating the drive means 13.

This would of course demand a very flexible coupling 18 between the drive means 13 and the equipment 22 to ensure that the vibrations was not transferred to the drive means 13, which could damage the drive means 13 or at least reduce its life.

In this embodiment of the invention the test bench 12 does not comprise other load applying means 19 than the utility grid or the utility grid simulating means of the test bench 12 providing indirect load to the equipment but in another embodiment the bench 12 could be provided with load applying means 19, inflicting an dynamically adjustable axial load 26 to the input shaft 21 of the equipment 22 as indicated by the arrows on the figure. This could be done to simulate an axial load induced on the equipment in real life.

In another embodiment the bench 12 could also be provided with other load applying means 19 such as means applying substantially radial load to the input shaft 21 of the equipment 22.

In another embodiment of the invention the connection flanges of the test bench 12—to which the equipment 22 is attached during the test—could also comprise means for providing load to the equipment 22 e.g. some sort of load applying means 19 applying a load simulating a yaw mechanism (not shown) of a wind turbine 1 or the test bench 12 could apply load to another part of the tested equipment 22 such as a load carrying structure 10 of a nacelle 3 or an output shaft of the tested equipment 22 or in any other way to apply load to the tested equipment 22 e.g. to increase the efficiency and/or realism of the test.

Figure 5:
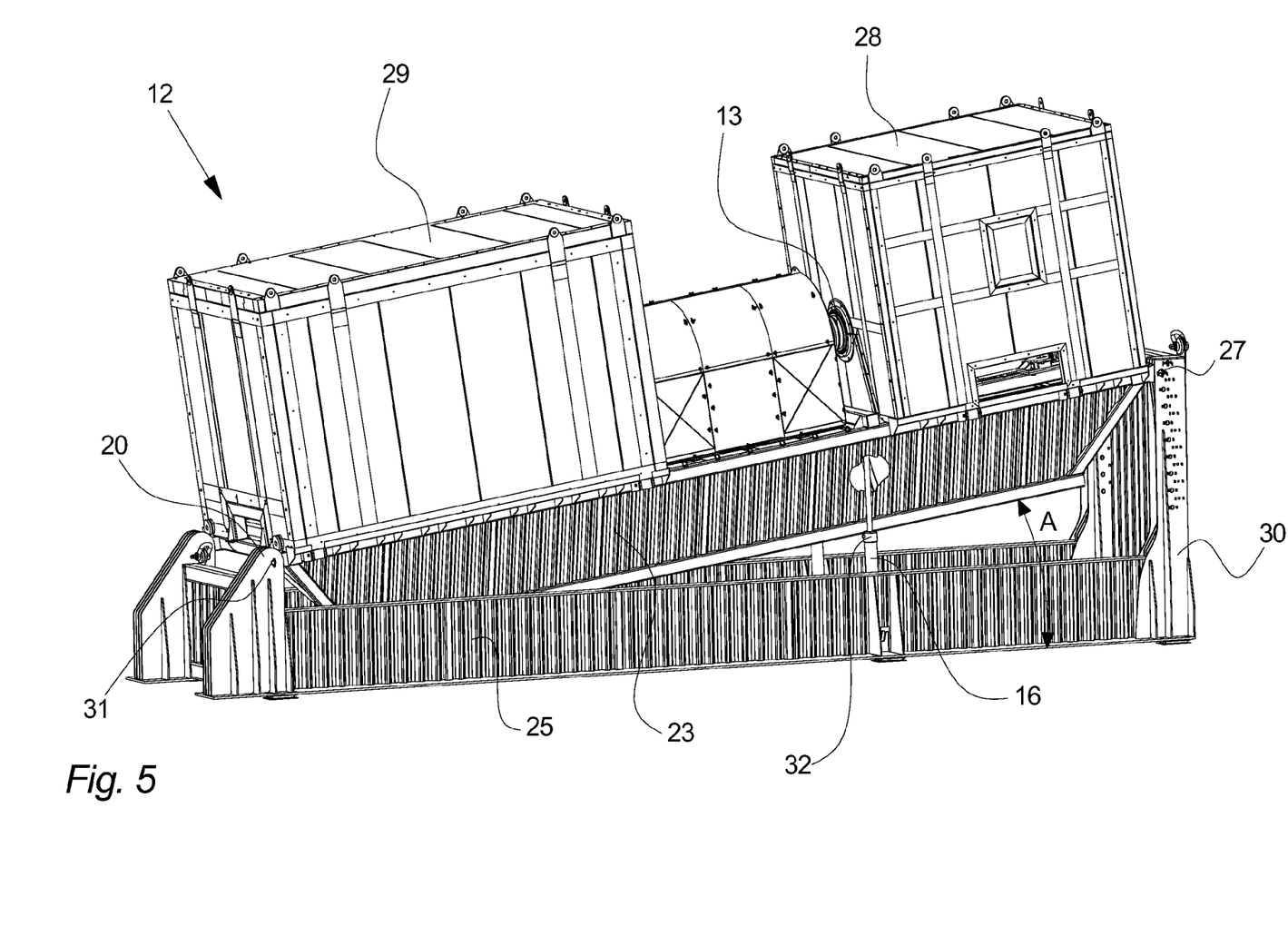
FIG. 5 illustrates a test bench during the test of wind turbine equipment, as seen in perspective.

FIG. 5 illustrates a test bench 12 during the test of wind turbine equipment 22, as seen in perspective.

In this embodiment of the invention the top part 23 of the test bench 12 is tilted to a test angle A of approximately 8° in relation to the stationary bottom part 25. The rotational joint 20 between the top part 23 and the bottom part 25 is in this embodiment formed by plate parts of the top part 23 and bottom part 25 merged with each other and connected to a common rotational pin 31 but in another embodiment the rotational joint 20 could be enabled by means of bearings (either ball, needle, roller, sliding bearings or any combination hereof) or by means of placing the top part 23 in a cradle of the bottom part 25 or any other way enabling substantially free rotational movement between the parts 23, 25.

The angle adjustment means 16 further comprise two linear actuators 32—in this case in form of two hydraulic cylinders but in another embodiment the linear actuators 32 could be pneumatic cylinders, motor driven spindles or other or the angle adjustment means 16 could comprise a tackle, a winch, a gear motor acting directly or indirectly (e.g. through a chain) on a rotational shaft of the bench 12 or the adjustment could simply be done by use of a crane.

In this embodiment the top part 23 are kept stationary during the test but in another embodiment the angle adjustment means 16 or other could induce oscillations or vibrations to the tested equipment 22 during the test e.g. to simulate tower 2 oscillations, vibrations from the blades 5, from other wind turbine equipment or other to establish a realistic load scenario.

In this embodiment of the invention the bench 12 tests a generator 8, which 3 is connected to grid simulating means enabling, that the generator 8 during the test indirectly can act as a load applying mean of the test bench 12, in that it is possible to simulate different grid situations such as extreme overload situations, fault situations short circuits and other. The different situations of the grid will thereby through the generator 8 indirectly apply different load situations on the tested equipment 22.

In another embodiment the generator 8 could simply be connected to the utility grid in the same way as it would be in an operating wind turbine 1.

In this embodiment of the invention a main part of the drive means 13 are enclosed by a sound absorbing box 28 for reducing the noise emitted from the test bench 12. In another embodiment the entire test bench 12 could be enclosed by a sound absorbing box 28 or the individual noise producing parts of the test bench 12 could be individually equipped with noise reducing means 28. In this embodiment the noise reducing means 28 are passive but in another embodiment the means 28 could be active e.g. by providing noise in antiphase or other.

In this embodiment the tested equipment 22 is substantially enclosed by a climate box 29, which enables that the temperature inside the box 29 can be adjusted and controlled freely between −45° and +55° Celsius when the equipment 22 is inactive and not operating and between −40° and +90° Celsius during operation of the equipment 22. These temperature ranges are in the present embodiment of the invention sufficient to provide an efficient and/or realistic environment for the tested equipment 22 but in another embodiment the bench 12 could comprise means for controlling the ambient temperature of the equipment 22 within different ranges and the climate controlling means 29 could further comprise means for controlling other climate parameters such the humidity and/or the air pressure.

Figure 6:
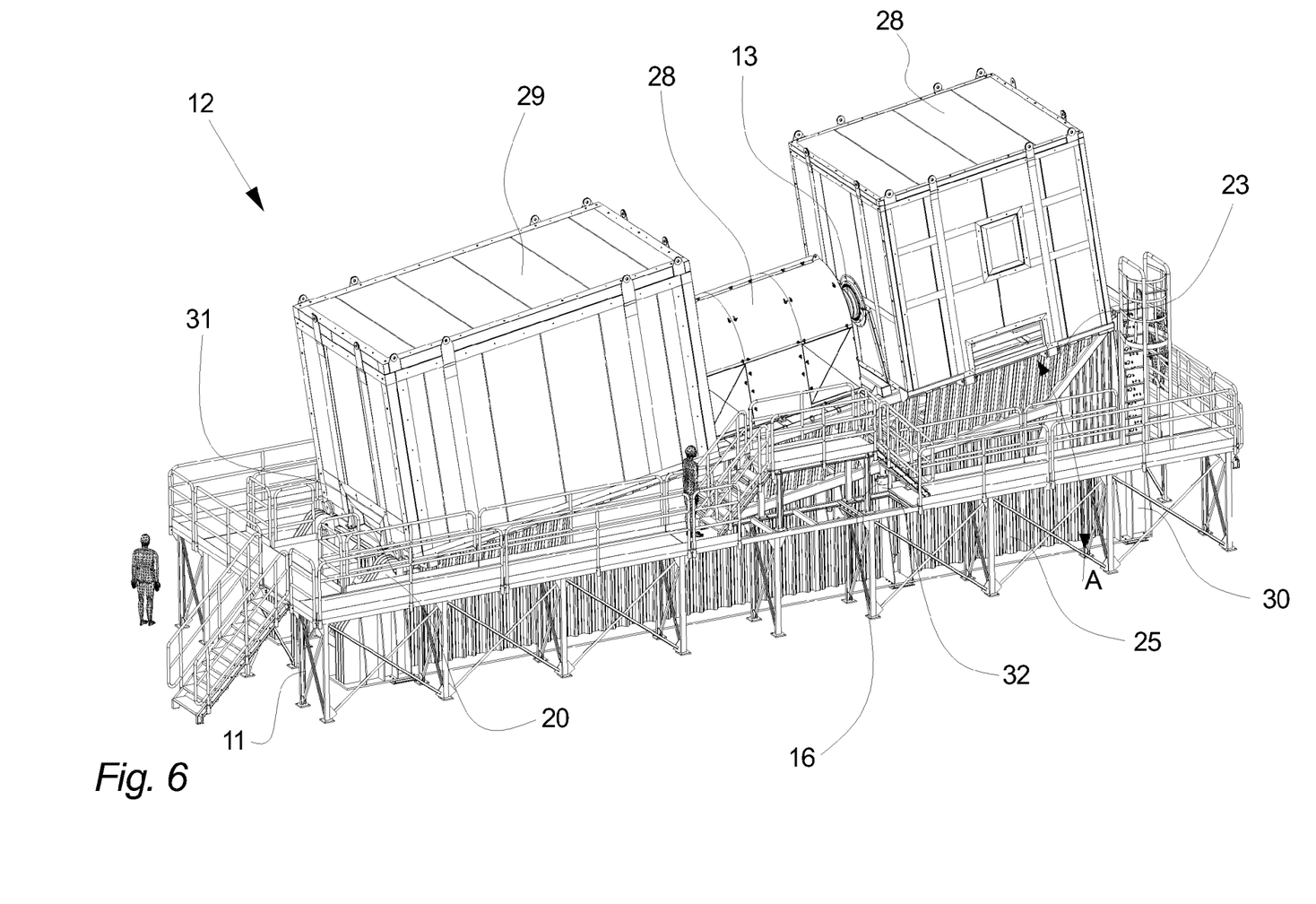
FIG. 6 illustrates a lay-out of an embodiment of a test bench, as seen in perspective.

FIG. 6 illustrates a lay-out of an embodiment of a test bench 12, as seen in perspective.

In this embodiment of the invention the carrying structure of the top part 23 and the bottom part 25 of the test bench 12 is made of a mostly welded latticework of steel tubes or beams wherein between a number of strengthening members in form of trapezium profiled plates are welded. Trapezium profiled plates are plates formed as a straight part followed by two e.g. 45° bends in opposite directions and then another straight part displaced from the first, then two 45° again and so on. By providing the open areas of the latticework with these profiled plates the carrying structure of the test bench 12 becomes very strong and rigid.

In another embodiment of the invention the carrying structure of the test bench 12 could be made in a multitude of different way such as a structure mainly connected by fastening means such as bolt, screws or rivets, it could be partly or completely moulded in cast-iron or concrete, it could be any combination of the above mentioned techniques or any other technique which would ensure that the test bench 12 was rigid enough to transfer the desired loads in the desired amounts at the desired locations satisfactory to ensure that the test results are as reliable as possible.

In this embodiment of the invention the carrying structure of the test bench 12 further comprise a number of vibration damping means in form of rubber plates strategically placed between the steel tubes of the carrying structure of the test bench 12 and by providing the connection points or points of support to the ground with vibration dampening means substantially preventing any vibration of the test bench 12 from being transmitted to the ground.

In another embodiment of the invention the test bench 12 could comprise other kinds of vibration dampening means such as active dampening means, by providing the test bench 12 with vibration dampening liquid reservoirs by providing the bench 12 with strategically placed shock absorbers or other.

In this embodiment the entire test bench 12 is surrounded by a scaffolding 11 enabling access to the bench 12 from all sides.

The invention has been exemplified above with reference to specific examples of test benches 12, wind turbine equipment 22, load applying means 19, angle adjustment means 16 and other. However, it should be understood that the invention is not limited to the particular examples described above but may be designed and altered in a multitude of varieties within the scope of the invention as specified in the claims.

What is claimed is:

1. A test bench for testing wind turbine equipment, said test bench comprising one or more load applying means directly or indirectly applying load to said equipment during said test, wherein said test bench comprises angle adjustment means for adjusting an elevation angle (A) of said equipment in relation to a horizontal plane.

2. The test bench according to claim 1, wherein said angle adjustment means comprise means for adjusting said elevation angle (A) to substantially correspond to a normal operation angle (NA) of said equipment.

3. The test bench according to claim 1, wherein drive means of said test bench rotates an input shaft of said equipment during the test.

4. The test bench according to claim 1, wherein said equipment are wind turbine drive train components and wherein said generator being connected to a utility grid or utility grid simulating means.

5. The test bench according to claim 4, wherein said utility grid or utility grid simulating means being an indirect load applying mean of said test bench.

6. The test bench according to claim 4, wherein said utility grid simulating means comprise means for dynamically adjusting the grid voltage and the grid frequency.

7. The test bench according to claim 1, wherein at least one of said one or more load applying means comprise means for applying at least one of axial and radial load to an input shaft of said equipment.

8. The test bench according to claim 1, wherein said equipment is a wind turbine generator.

9. The test bench according to claim 1, wherein said test bench comprise climate controlling means for substantially controlling one or more climate parameters of the surroundings of at least a part of said equipment.

10. The test bench according to claim 1, wherein said angle adjustment means comprise one or more linear actuators for positioning said test bench or a part of said test bench comprising said equipment in said elevation angle (A).

11. The test bench according to claim 10, wherein said one or more linear actuators are hydraulic cylinders.

12. The test bench according to claim 1, wherein said load applying means comprise means for inflicting an axial load to an input shaft of said equipment.

13. A method for testing wind turbine equipment, said method comprising the steps of:
positioning said equipment in a test bench,
establishing said equipment in an elevation angle (A) by means of angle adjustment means of said test bench, and
applying load to said equipment by means of load applying means of said test bench.

14. A method for testing wind turbine equipment, said method comprising the steps of:
establishing a test bench in an elevation angle (A) by means of angle adjustment means of said test bench,
positioning said equipment in said test bench, and
applying load to said equipment by means of load applying means of said test bench.

15. The method according to claim 13, wherein said elevation angle (A) being stationery or dynamically adjustable during said test.

16. The method according to claim 13, wherein an input shaft of said equipment is rotated by drive means of said test bench during the test.

17. The method according to claim 13, wherein load is applied to said equipment by connecting a generator of said equipment to a utility grid or utility grid simulating means.

18. The method according to claim 13, wherein at least one of axial and radial load is applied to an input shaft of said equipment during the test.

19. A method according to claim 13, wherein one or more climate parameters of the surroundings of at least a part of said equipment is controlled during the test.

* * * * *